United States Patent
Tada et al.

(10) Patent No.: US 7,171,906 B2
(45) Date of Patent: Feb. 6, 2007

(54) FRICTION-DRIVE CARRIAGE TYPE CONVEYOR

(75) Inventors: Shoji Tada, Shiga (JP); Yoshito Kaida, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 10/912,373

(22) Filed: Aug. 5, 2004

(65) Prior Publication Data

US 2005/0061194 A1    Mar. 24, 2005

(30) Foreign Application Priority Data

Sep. 8, 2003    (JP)    ............................. 2003-314916

(51) Int. Cl.
*B61B 9/00*    (2006.01)
(52) U.S. Cl. ...................................... 104/165
(58) Field of Classification Search ................. 104/96, 104/106, 107, 165, 166, 170
See application file for complete search history.

(56) References Cited

U.S. PATENT DOCUMENTS

| | | | | |
|---|---|---|---|---|
| 4,838,171 A | * | 6/1989 | Yokoi et al. ................. | 104/166 |
| 5,067,413 A | * | 11/1991 | Kiuchi et al. ................ | 104/168 |
| 5,159,880 A | * | 11/1992 | Mugnier ....................... | 104/87 |
| 5,839,567 A | * | 11/1998 | Kyotani et al. ............. | 198/683 |
| 6,494,142 B2 | * | 12/2002 | Masugaki et al. .......... | 104/168 |

FOREIGN PATENT DOCUMENTS

JP    2000-177584    6/2000

JP    3502977    12/2003

* cited by examiner

*Primary Examiner*—S. Joseph Morano
*Assistant Examiner*—Robert J. McCarry, Jr.
(74) *Attorney, Agent, or Firm*—Schweitzer, Cornman, Gross & Bondell LLP

(57) ABSTRACT

A friction-drive carriage type conveyor includes a carriage 1 so supported as to run in a running direction along a track, which includes a linear path and a turning path 18. The carriage 1 has a frictional surface 6a continuing linearly along its whole length. The conveyor is fitted with first friction drive rollers 15 for contact with the frictional surface 6a, which are positioned near the linear path. The conveyor is also fitted with second friction drive rollers 15A–15C for driving the carriage 1 smoothly and reliably even along the turning path 18. The second friction drive rollers 15A–15C are spaced at intervals along the turning path 18, which are shorter than the frictional surface 6a. The second friction drive rollers 15A–15C are so supported that each of them can move between an advance limit position and a retraction limit position. The advance limit position is on the locus described by the frictional surface 6a when the carriage 1 passes along the turning path 18. The retraction limit position is outside the locus. Each of the second friction drive rollers 15A–15C can be biased toward the associated advance limit position by a biasing means, which may be a hydraulic cylinder 25. Each of the second friction drive rollers 15A–15C comes into compressive contact with the frictional surface 6a of the carriage 1 driven forward by the just upward friction drive roller and drives the carriage to a position where the frictional surface comes into compressive contact with at least the just downstream friction drive roller.

8 Claims, 6 Drawing Sheets

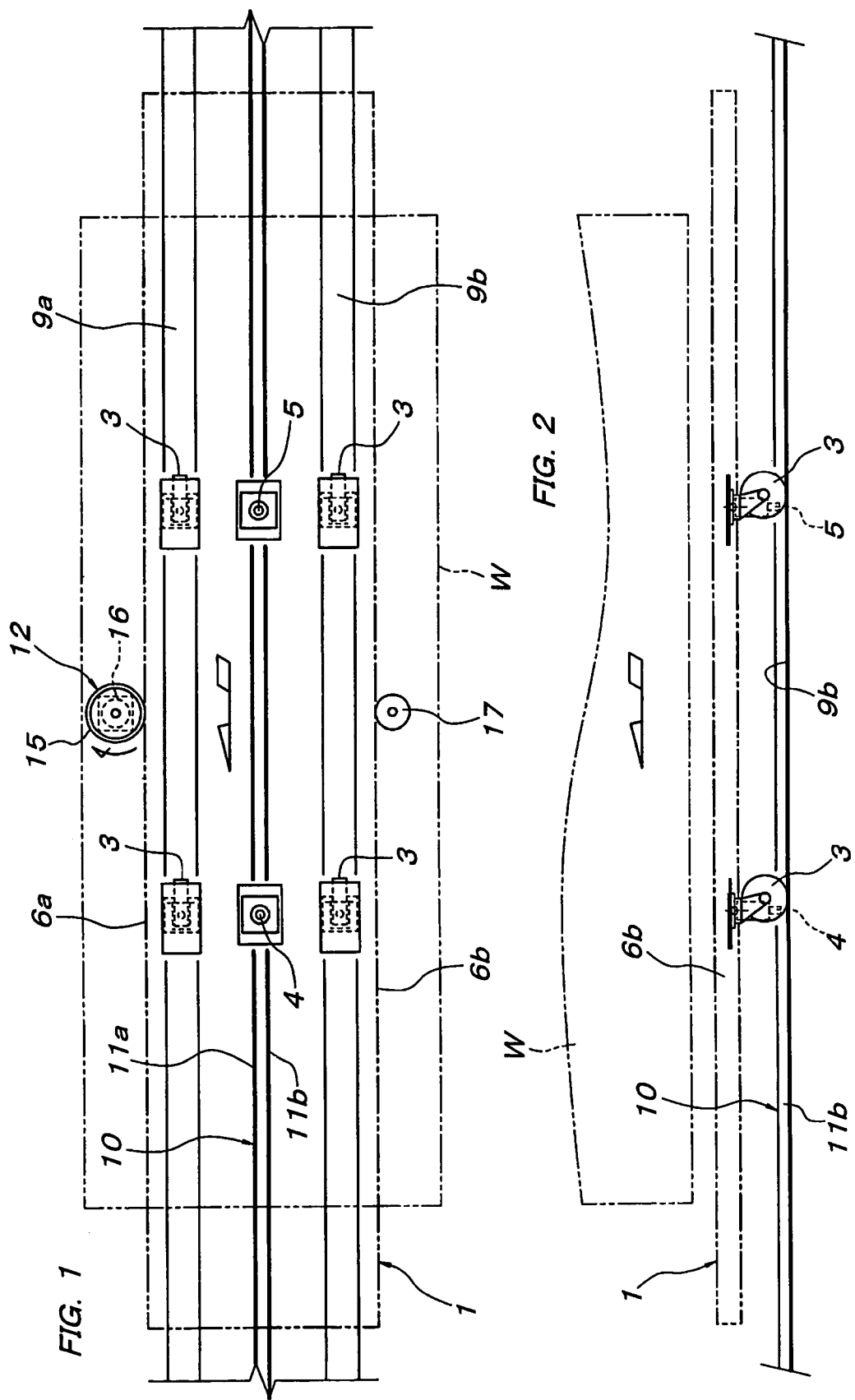

FRICTION-DRIVE CARRIAGE TYPE CONVEYOR

FIELD OF THE INVENTION

The present invention relates to a friction-drive carriage type conveyor with a relatively long integral carriage, which has no horizontal joint over its whole length. In particular, the invention relates to a friction driver for driving the carriage along a turning path of a track.

PRIOR ART

For example, Japanese Examined Patent Publication No. H7-53503 discloses a friction-drive carriage type conveyor including a carriage and a friction drive roller, which is fitted at a horizontal track. The carriage runs along the track and has a frictional surface continuing linearly along its whole length for contact with the drive roller.

In this type of conveyor, if the track includes a turning path, the carriage runs along this path, with its frictional surface shifting inward of the path. The turning path may be a right-angle turning path, which turns the carriage by 90 degrees. The radius of curvature of the right-angle turning path may be so short that the carriage lies through both ends of this path when the carriage reaches the middle of the path, turning by 45 degrees. In this case, the frictional surface shifts inward of the turning path very greatly.

More specifically, in this case, when the carriage passes through the middle of the right-angle turning path, the frictional surface shifts laterally to the maximum as seen from the inside of this path. Friction drive rollers for compressive contact with the frictional surface might be fitted inside the turning path so that the carriage could be driven continuously even along this path. The drive rollers might be positioned off the middle of the turning path, where the frictional surface shifts to the maximum, as stated above. However, the drive rollers would need to move greatly toward and away from the turning path and be in compressive contact with the frictional surface with a roughly constant pressure. This would be very difficult to put into practice.

Therefore, conventionally, continuous drive by means of friction drive rollers along turning paths has been carried out only in carriage type conveyors in which each carriage has a frictional surface with a horizontal bending part positioned midway between both its ends. One of these conveyors includes a carriage including load bars, which are connected together and can swing horizontally. Each of the load bars is supported by a trolley and has a frictional surface formed on one side. One of the load bars supports a deck. As is the case with the present invention, the carriage might have a frictional surface continuing linearly along its whole length. In this case, the carriage driver at the turning path would need to be an exclusive driver for a turning path. The exclusive driver differs from a friction driver including a friction drive roller. This would greatly raise the cost of the whole equipment.

SUMMARY OF THE INVENTION

The object of the present invention is to provide a friction-drive carriage type conveyor that solves the foregoing problem.

A friction-drive carriage type conveyor according to the present invention includes a carriage so supported as to run in a running direction along a track, which includes a linear path and a turning path. The carriage has a frictional surface continuing linearly along its whole length. The conveyor is fitted with a first friction driver at the linear path. The first friction driver includes a first friction drive roller for contact with the frictional surface. The conveyor is also fitted with a second friction driver inside the turning path. The second friction driver includes a plurality of second friction drive rollers for contact with the frictional surface. The second friction drive rollers are spaced at intervals along the turning path, which are shorter than the frictional surface. The second friction drive rollers are so supported that each of them can move between an advance limit position and a retraction limit position. The advance limit position is on the locus described by the frictional surface when the carriage passes along the turning path. The retraction limit position is outside the locus. The second friction driver also includes biasing means, each of which biases one of the second friction drive rollers toward the associated advance limit position. Each of the second friction drive rollers comes into compressive contact with the frictional surface of the carriage driven forward by the just upward friction drive roller and drives the carriage to a position where the just downstream friction drive roller comes into compressive contact with the frictional surface.

Although the frictional surface continues linearly along the whole length of the carriage, it is possible to drive the carriage continuously even along the turning path, with the frictional surface in contact with the friction drive rollers. In other words, there is no need to use a special driver for the turning path, but it is possible to produce a friction driver for the turning path at low cost with friction drive rollers similar to the drive roller of the friction driver for the linear path. This makes the conveyor general in purpose and practical.

Generally in a practical track layout, the turning path is a right-angle turning path for changing the running direction by a roughly right angle. The right-angle turning path has a radius of curvature which is so small that the carriage lies through both ends of the turning path when the carriage reaches the middle of the turning path, turning by 45 degrees. In such a case, the second friction drive rollers may be two end rollers positioned near both ends of the right-angle turning path and a middle roller positioned between the end rollers. These three friction drive rollers may be spaced at substantially regular intervals. In this case, the middle roller is farther than the end rollers from the center line of the turning path. Thus, the second friction driver for driving the carriage along the right-angle turning path conditioned as stated above can be produced with only three friction drive rollers. It is also possible to shorten the distance for which each of the friction drive rollers moves radially of the turning path. It is further possible to drive the carriage smoothly with ease, with the roller torque converted efficiently into thrust for the carriage.

The biasing means for biasing each of the second friction drive rollers may be either a spring or a hydraulic cylinder. The hydraulic cylinder makes it easy to press the associated roller against the frictional surface with a constant pressure.

The second friction drive rollers may be so spaced that two adjacent ones of them can be in contact with the frictional surface at the same time for a certain part of the turning path. The drive of the thus spaced rollers may be so controlled that, while two adjacent ones of them are in contact with the frictional surface at the same time, the upstream one of the two adjacent rollers is released from the action of driving the carriage. In this case, the second friction drive rollers can be spaced roughly. Even while the two adjacent rollers are in contact with the frictional surface at the same time, practically one of them keeps driving the carriage. The points on the frictional surface which are in contact with two adjacent ones of the second friction drive rollers at the same time have different turning radii. In other words, the two points turn with different radii while the carriage runs along the turning path. Accordingly, if the two adjacent rollers drove the carriage at the same time, they would wear away unduly. The prevention of undue wear enables the carriage to run stably at a fixed speed along the turning path.

Specifically, the upstream one of the two adjacent friction drive rollers may be released from the action of driving the carriage by being rendered free to rotate. In this case, each of the second friction drive rollers may be driven by a brakeless motor which is small in counter torque, and which has a speed reducer. Power can be disconnected from the brakeless motor so that the associated roller is released from the driving action. A clutch may be interposed between the output shaft of the speed reducer and the associated roller. The clutch can be released so that the associated roller is released from the driving action. This makes it relatively easy to implement the foregoing control.

The upstream one of the two adjacent friction drive rollers may be released from the driving action by being moved away from the center line of the turning path so that the upstream roller completely leaves the frictional surface. In this case, the second friction drive rollers may be driven always without motor on-off control. Alternatively, the second friction drive rollers may be in contact with the frictional surface for a short time so that their lives can be very long.

The biasing means for biasing each of the second friction drive rollers toward the center line of the turning path may be a hydraulic cylinder. The upstream one of the two adjacent rollers may be released from the driving action by being moved away from the center line by the associated hydraulic cylinder so that the upstream roller leaves the frictional surface. The hydraulic cylinder functions as both the biasing means, which is essential in pressing the associated roller against the frictional surface, and a means for moving the roller away from the center line. This simplifies the whole structure of the second friction driver for the turning path and cuts down costs.

The second friction drive rollers may be so spaced that, just before one second friction drive roller in contact with the frictional surface leaves the frictional surface when the carriage runs along the turning path, with the frictional surface turning, the just downstream friction drive roller comes into contact with the frictional surface. The carriage can be driven by the thus spaced rollers one after one. The thus spaced rollers can be driven always. As stated above, the carriage can be driven by the thus spaced rollers one after one, without position control for moving them out of contact with the frictional surface.

BRIEF DESCRIPTION OF THE DRAWINGS

A preferred embodiment of the present invention is shown in the accompanying drawings, in which:

FIG. 1 is a partial top plan of a friction-drive carriage type conveyor embodying the present invention;

FIG. 2 is a partial side view of the conveyor;

DETAILED DESCRIPTION OF THE PREFERRED EMBODIMENT

Figure 3:
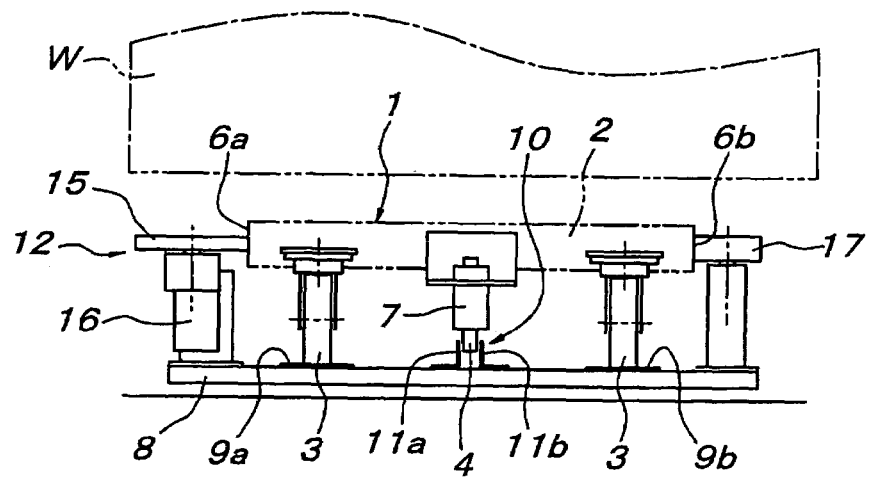
FIG. 3 is front views of a carriage and a friction driver of the conveyor.

With reference to FIGS. 1–3, a friction-drive carriage type conveyor embodying the present invention includes a carriage 1, which runs in a running direction along a horizontal closed-loop track on a floor. The carriage 1 includes a long integral deck 2 for supporting a car body or another work W. The deck 2 has no horizontal joint between both its ends.

The deck 2 has a pair of frictional surfaces 6a and 6b formed on its right and left sides, respectively, in the running direction. The frictional surfaces 6a and 6b may be the right and left side surfaces of the deck 2 itself. Alternatively, the frictional surfaces 6a and 6b may be the outer surfaces of longitudinal members fixed to the deck 2 near both sides of the deck. Of course, as conventionally known, the frictional surfaces 6a and 6b might be the right and left side surfaces of a longitudinal member fixed to the deck 2 along the center line of the deck.

The bottom of the deck 2 is fitted with a pair of front casters 3 and a pair of rear casters 3. The casters 3 are positioned on both sides of the center line of the deck 2.

The bottom of the deck 2 is also fitted with a front guided member 4 and a rear guided member 5, which are positioned on the center line of the deck 2 midway between both ends of the deck. Each of the guided members 4 and 5 is a vertical pin, which is supported rotatably on a vertical axis by a vertical supporting cylinder 7 fixed to the deck 2. The vertical pin extends vertically through the supporting cylinder 7. The bottom of the pin protrudes from the cylinder 7. The guided members 4 and 5 might have another structure.

A pair of parallel belt plates 9a and 9b extends along the whole length of the track and are supported by a number of cross frames 8, which rest on the floor. Alternatively, the belt plates 9a and 9b might lie directly on the floor. The casters 3 roll on the belt plates 9a and 9b, but could roll directly on the floor.

A guide rail 10 lies between and in parallel with the belt plates 9a and 9b along the whole length of the track and is supported by the cross frames 8. The guide rail 10 consists of a right vertical plate 11a and a left vertical plate 11b, which are spaced from each other so that the bottoms of the guided members 4 and 5 can engage loosely with them. The guided members 4 and 5 and guide rail 10 define the track, which might be defined by any other structure.

Figure 4:
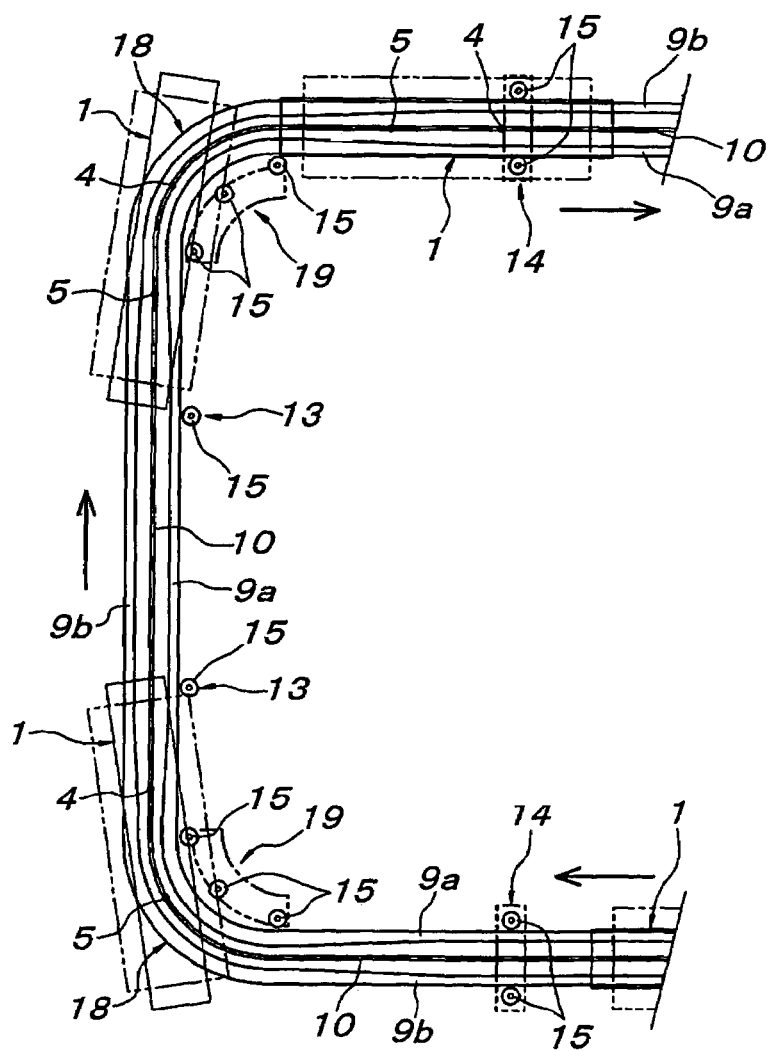
FIG. 4 is a partial top plan of the track of the conveyor.

With reference to FIGS. 1, 3 and 4, friction drivers 12–14 are fitted along the track. Each of the friction drivers 12–14 includes one or two friction drive rollers 15 and one or two motors 16 for driving the roller or rollers. Each friction drive roller 15 is supported rotatably on a vertical axis and biased for compressive contact with the frictional surface 6a or 6b of the carriage 1 by a biasing means (not shown). Each of the friction drivers 12 includes one friction drive roller 15 and a backup roller 17 for contact with the frictional surface 6a or 6b with which the friction drive roller does not contact. Each of the friction drivers 13 includes one friction drive roller 15 and no backup roller. Each of the friction drivers 14 includes two friction drive rollers 15 fitted on both sides of the track and no backup roller. Thus, friction drivers 12–14 can be used selectively depending on where they are fitted.

FIG. 4 shows part of the closed-loop track, which includes linear paths and two right-angle turning paths 18 for turning the carriage 1 by a roughly right angle. Each of the turning paths 18 has a radius of curvature which is so short that, when the carriage 1 runs to the middle of the turning path, turning by 45 degrees, the carriage lies through both ends of the path (position D in FIG. 8). A friction driver 19 is fitted inside each of the turning paths 18 and includes three friction drive rollers 15A–15C, which are supported near both ends and the middle of the path.

Figure 5:
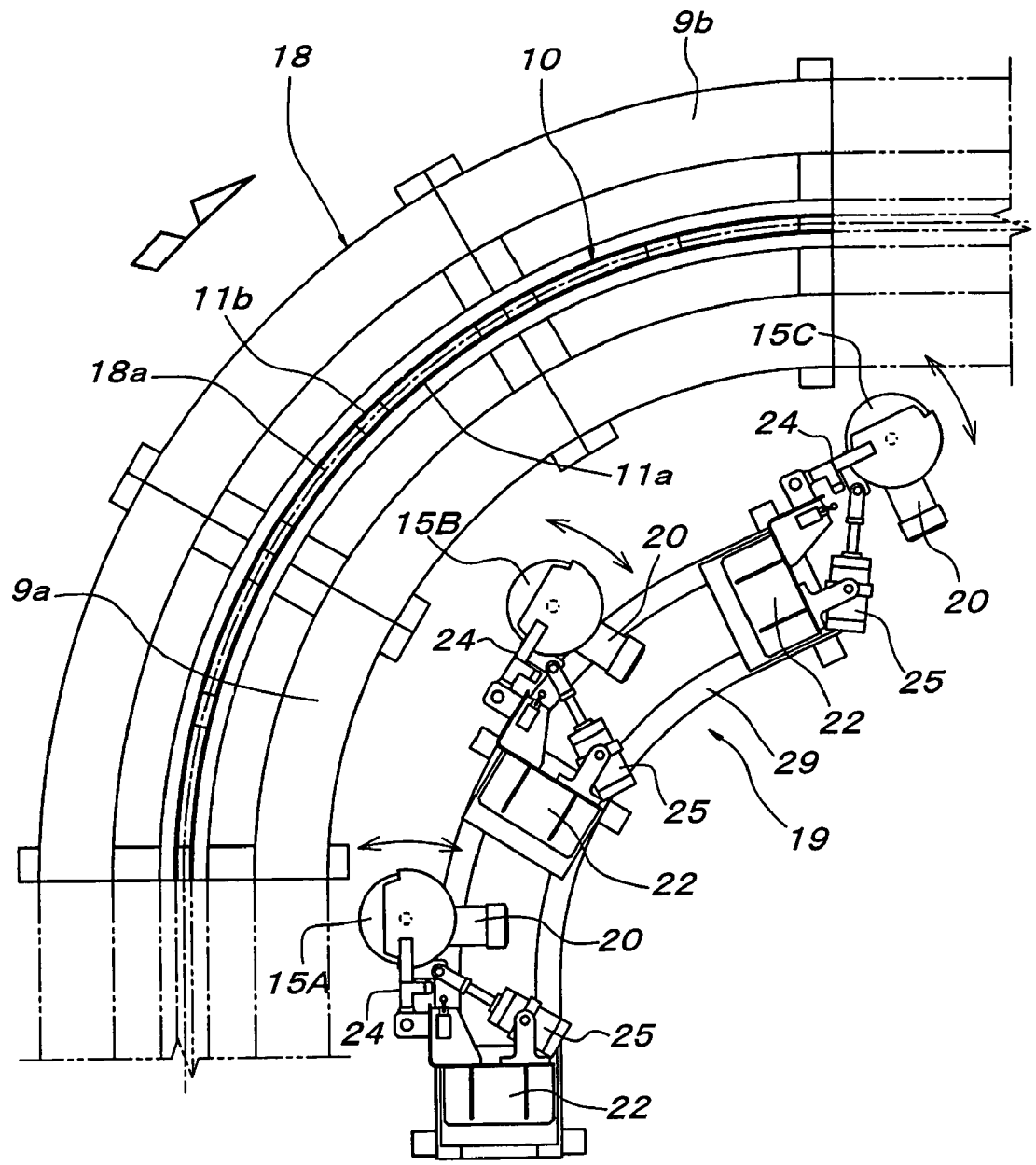
FIG. 5 is top plans of a turning path of the track and a friction driver for this path.
Figure 6:
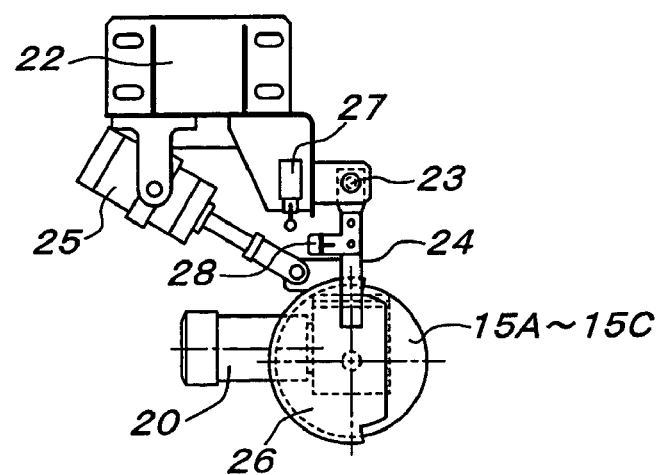
FIG. 6 is a top plan of a friction drive roller unit of the friction driver shown in FIG. 5.

FIGS. 5 and 6 show one of the friction drivers 19 for the turning paths 18 in detail. Each of the friction drive rollers 15A–15C is fixed to the vertical output shaft 21 of a motor 20 fitted with a speed reducer. The motor 20 is fixed to the free end of a horizontal pivot arm 24, which is supported by a support 22 pivotably within a limited range on a vertical pin 23. An air cylinder 25 as a biasing means is interposed between the support 22 and pivot arm 24. A protective cover 26 is fixed to the pivot arm 24 and protects the associated friction drive roller 15A, 15B or 15C. A limit switch 27 is fitted to the support 22 and functions as a position sensor for the associated friction drive roller 15A, 15B or 15C. The pivot arm 24 has a protrusion 28. When the air cylinder 25 pulls the pivot arm 24 until the associated friction drive roller 15A, 15B or 15C is retracted to a retraction limit position, the arm protrusion 28 pushes the limit switch 27.

With reference to FIG. 5, the supports 22 supporting the friction drive rollers 15A–15C of each of the friction drivers 19 are fixed to an arcuate frame 29, which is installed on the floor inside the associated turning path 18. The pivotal movement of each pivot arm 24 moves the associated friction drive roller 15A, 15B or 15C horizontally toward or away from the center line 18a of the turning path 18. Each friction drive roller 15A, 15B or 15C can move horizontally between an advance limit position as a home position and its retraction limit position. In the advance limit position, the peripheral surface of the drive roller 15A, 15B or 15C is positioned between the center line 18a and the locus of the right frictional surface 6a of the carriage 1 running along the turning path 18. In the retraction limit position, the frictional surface 6a is retracted away from the center line 18a slightly inward of the surface locus. The air cylinder 25 for each of the friction drive rollers 15A–15C has a stroke for moving the associated roller between the advance and retraction limit positions. While the air cylinder 25 is most extended with a preset air pressure, the associated friction drive roller 15A, 15B or 15C is held in its advance limit position.

The locus of the frictional surface 6a of the carriage 1 running along the turning path 18 is nearest to the center of curvature of the path at the middle friction drive roller 15B. Accordingly, the distance between the center line 18a of the turning path 18 and the advance limit position of the middle friction drive roller 15B is longer than that between the center line 18a and the advance limit position of each of the other friction drive rollers 15A and 15C. The air pressure supply system for each air cylinder 25 which biases the associated friction drive roller 15A, 15B or 15C toward the associated advance limit position is fitted with a relief valve for maintaining a constant pressure.

The carriage 1 can run along the track, with the guided members 4 and 5 engaging with the guide rail 10. The carriage 1 runs along each of the turning paths 18, with the guided members 4 and 5 moving on the associated center line 18a. The friction drivers 12–14 and 19 drives the carriage 1 in the running direction along the guide rail 10, with the friction drive rollers 15 and 15A–15C rotating in compressive contact with the frictional surface 6a.

Figure 7:
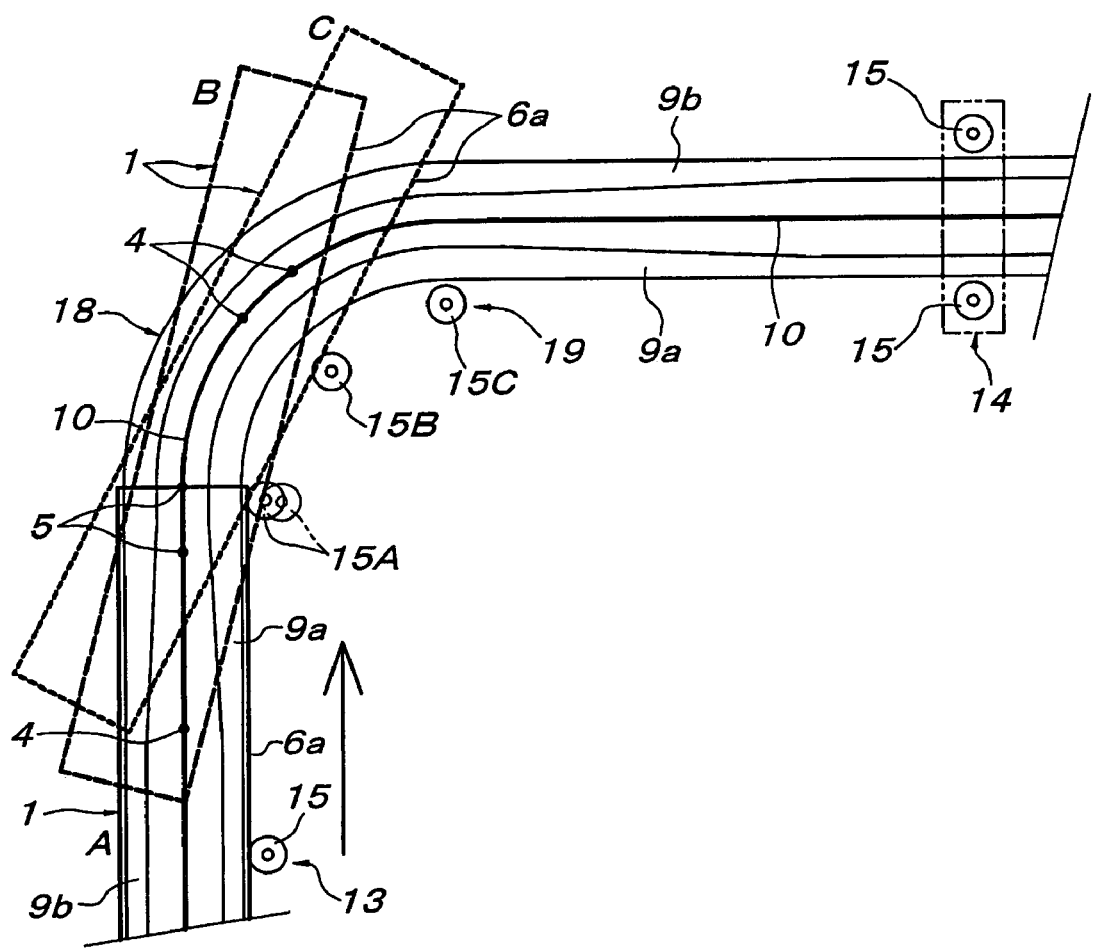
FIG. 7 is a partial schematic top plan of the track, showing the first phase of a carriage running along a turning path of the track.

With reference to FIG. 7, the friction driver 13 just upstream of the downstream turning path 18 drives the carriage 1 toward this path. When the carriage 1 driven by this friction driver 13 reaches a position A, where the frictional surface 6a is in contact with the upstream friction drive roller 15A of the friction driver 19 inside the turning path 18, this roller 15A is retracted slightly against the biasing force of the associated air cylinder 25 and comes into compressive contact with the frictional surface 6a with the constant pressure preset for the cylinder. The slight retraction of the friction drive roller 15A may be sensed by a sensor. Alternatively, the carriage 1 in the position A may be sensed by another sensor. In either case, the signal from the sensor is the basis for starting up the motor 20 for the friction drive roller 15A.

When the upstream friction drive roller 15A of the friction driver 19 starts to be driven, power may be disconnected from the motor 16 for the friction drive roller 15 of the friction driver 13 just upstream of the driver 19. While both friction drive rollers 15 and 15A are in contact with the frictional surface 6a, the carriage 1 is running linearly. Accordingly, even if both friction drive rollers 15 and 15A being driven are in contact with the frictional surface 6a, almost no harmful influence is exerted.

Each of the motors 16 and 20 of all friction drivers 12–14 and 19 is brakeless, small in counter torque and fitted with a speed reducer. While power is disconnected from the motor 16 or 20 for each of the friction drive rollers 15 and 15A, the roller can easily rotate in contact with the frictional surface 6a of the carriage 1 running along the track.

The upstream friction drive roller 15A of the friction driver 19 inside the downstream turning path 18 drives the carriage 1 into this path. As the front guided member 4 of the carriage 1 driven by this friction drive roller 15A moves along the center line 18a of the turning path 18, as shown at a position B in FIG. 7, the point on the frictional surface 6a which is in contact with the friction drive roller 15A shifts inward of this path 18, so that the surface 6a pushes the roller 15A away from the center line 18a. Because the friction drive roller 15A is biased with the constant air pressure by the associated air cylinder 25, the roller 15A is kept in compressive contact with the frictional surface 6a with a roughly constant pressure, so that the carriage 1 is propelled smoothly at the peripheral speed of the roller 15A.

When the carriage 1 reaches a position C, where the frictional surface 6a is in contact with the middle friction drive roller 15B of the friction driver 19, the roller 15B is retracted slightly against the biasing force of the associated air cylinder 25 and comes into compressive contact with the frictional surface 6a with the constant pressure preset for the cylinder. The slight retraction of the friction drive roller 15B may be sensed by a sensor. Alternatively, the carriage 1 in the position C may be sensed by another sensor. In either case, the signal from the sensor is the basis for starting up the associated motor 20 for the friction drive roller 15B. The sensor signal is also the basis for disconnecting power from the motor 20 for the upstream friction drive roller 15A and shifting this roller by the associated air cylinder 25 away from the frictional surface 6a to its retraction limit position, where the associated sensor 27 is pushed. As a result, the carriage 1 having reached the position C is driven forward along the turning path 18 by only the middle friction drive roller 15B.

Figure 8:
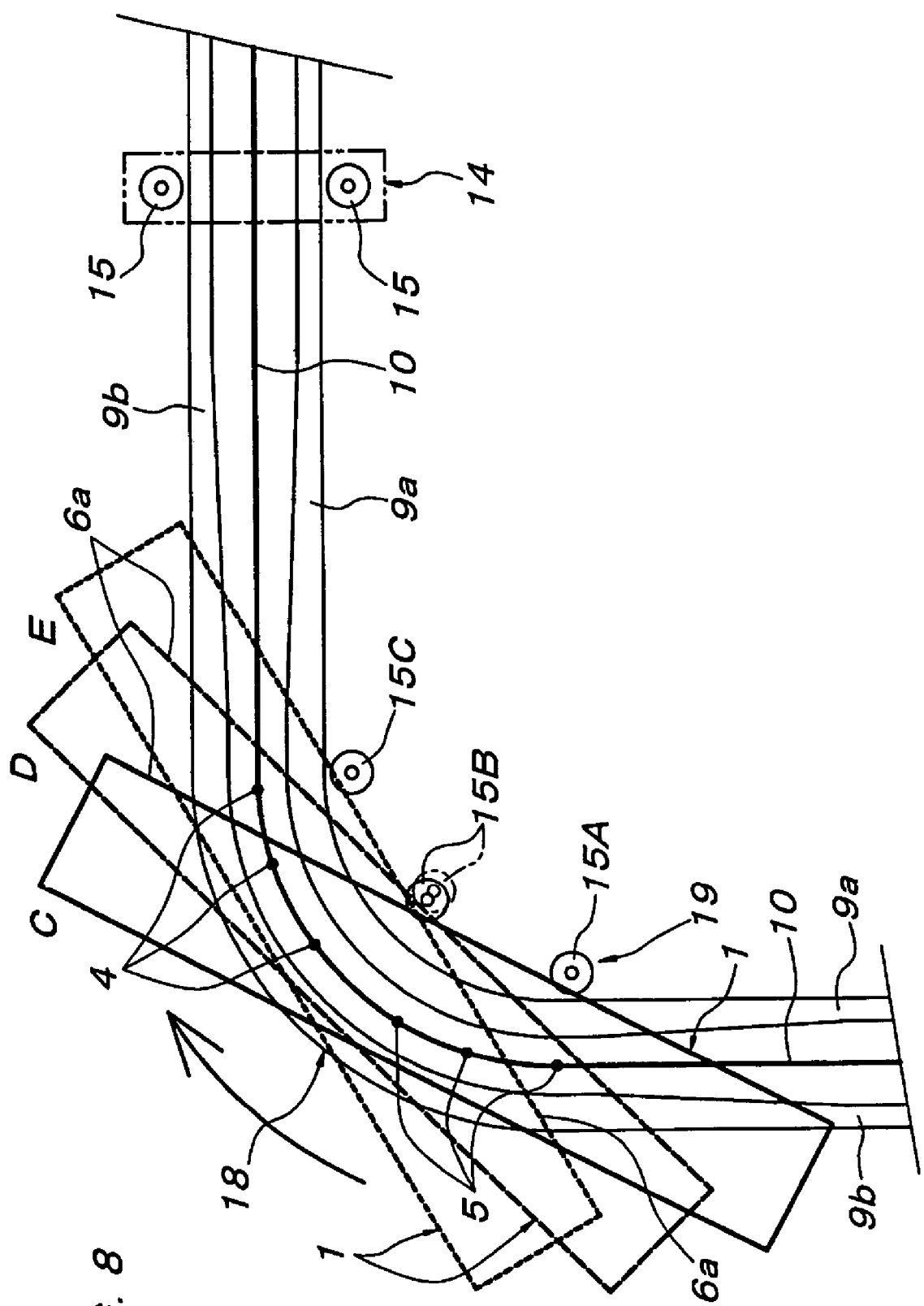
FIG. 8 is a partial schematic top plan of the track, showing the second phase of the carriage running along the turning path.

With reference to FIG. 8, as the middle friction drive roller 15B drives the carriage 1, the point on the frictional surface 6a which is in contact with the roller 15B shifts inward of the turning path 18, so that the surface 6a pushes the roller 15B away from the center line 18a of the path. As stated above, the friction drive roller 15B is kept in compressive contact with the frictional surface 6a with a roughly constant pressure, so that the carriage 1 can be propelled smoothly at the peripheral speed of the roller 15B.

When the carriage 1 reaches a position D in the middle of the turning path 18, the point on the frictional surface 6a which is in contact with the middle friction drive roller 15B shifts to the maximum inward of the path 18. In the meantime, power is kept disconnected from the motor 20 for the upstream friction drive roller 15A, and this roller is kept in the retraction limit position by the associated air cylinder 25. The upstream friction drive roller 15A is returned to its advance limit position by the air cylinder 25 when the frictional surface 6a is brought out of contact with this roller 15A in this position while the carriage 1 is passing along the turning path 18.

In the meantime, the downstream friction drive roller 15C of the friction driver 19 is held in its advance limit position. When the carriage 1 reaches a position E, where the frictional surface 6a is in contact with the friction drive roller 15C in the advance limit position, this roller is retracted slightly against the biasing force of the associated air cylinder 25 and comes into compressive contact with the surface 6a with the constant pressure preset for the cylinder 25. The slight retraction of the friction drive roller 15C may be sensed by a sensor. Alternatively, the carriage 1 in the position E may be sensed by another sensor. In either case, the signal from the sensor is the basis for starting up the motor 20 for the friction drive roller 15C. The sensor signal is also the basis for disconnecting power from the motor 20 for the middle friction drive roller 15B and retracting this roller by means of the associated air cylinder 25 away from the frictional surface 6a to its retraction limit position, as stated already. As a result, the carriage 1 having reached the position E is driven forward continuously along the turning path 18 by only the downstream friction drive roller 15C.

Figure 9:
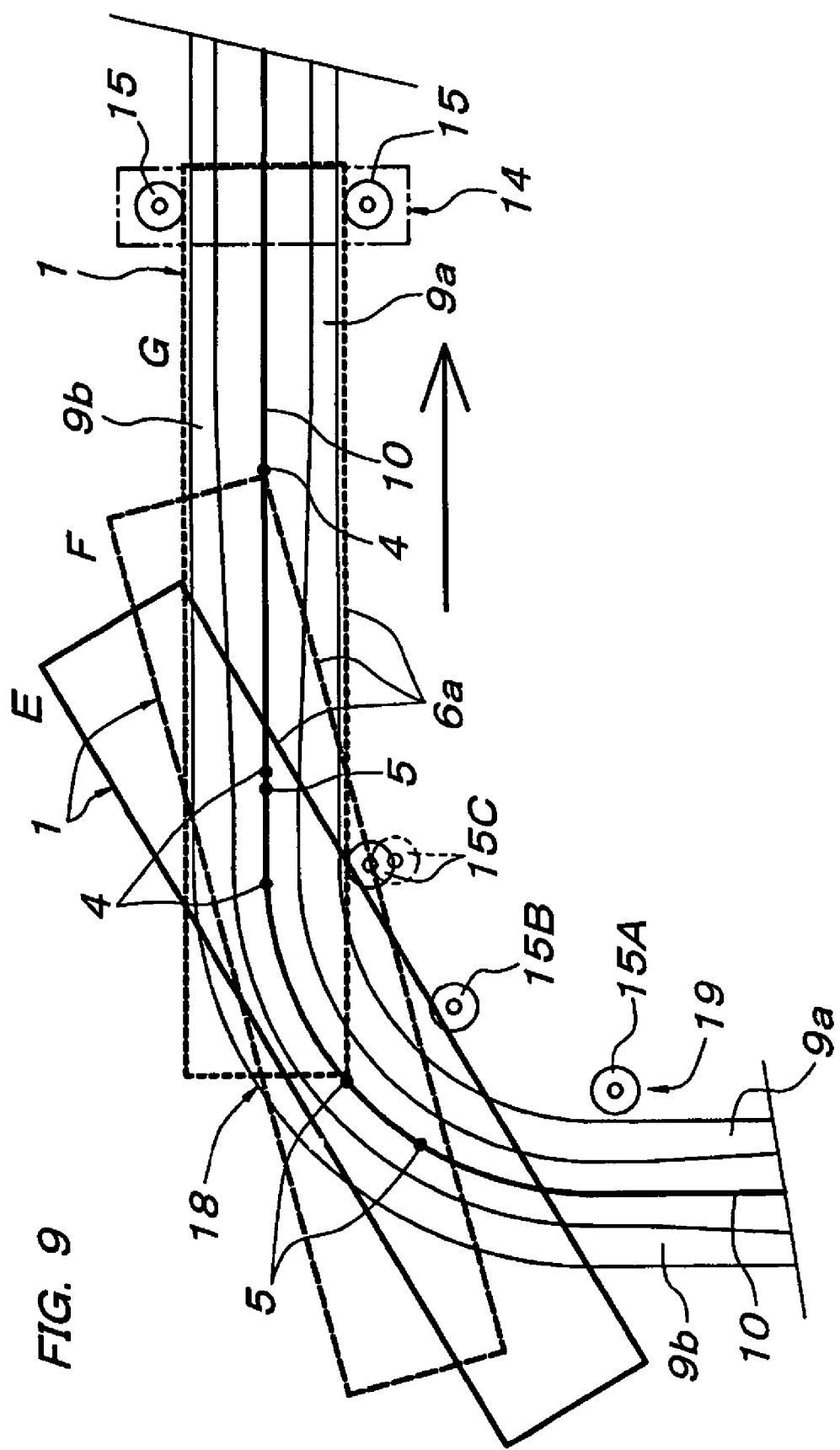
FIG. 9 is a partial schematic top plan of the track, showing the third phase of the carriage running along the turning path.

As shown by the position F in FIG. 9, as the upstream friction drive roller 15C drives the carriage 1, the point on the frictional surface 6a which is in contact with the roller 15C shifts inward of the turning path 18, so that the surface 6a pushes the roller 15C away from the center line 18a of the path. As stated above, the friction drive roller 15C is kept in compressive contact with the frictional surface 6a with a roughly constant pressure, so that the carriage 1 can be propelled smoothly at the peripheral speed of the roller 15C.

In the meantime, power is kept disconnected from the motor 20 for the middle friction drive roller 15B, and this roller is kept in its retraction limit position by the associated air cylinder 25. The friction drive roller 15B is returned to its advance limit position by the air cylinder 25 when the frictional surface 6a is brought out of contact with this roller 15B in this position while the carriage 1 is passing along the turning path 18.

With reference to FIG. 9, when the carriage 1 driven by the downstream friction drive roller 15C of the friction driver 19 reaches a position G, where the frictional surfaces 6a and 6b are in contact with the friction drive rollers 15 of the friction driver 14 just downstream of the turning path 18, these rollers 15 are retracted slightly against the biasing force of the associated biasing means. The slight retraction of the friction drive rollers 15 may be sensed by sensors. Alternatively, the carriage 1 in the position G may be sensed by another sensor. In either case, the signals or signal from the sensors or sensor is the basis for starting to drive the friction drive rollers 15. The sensor signals or signal is also the basis for disconnecting power from the motor 20 for the downstream friction drive roller 15C of the friction driver 19 inside the turning path 18 and, as stated already, shifting this roller 15C away from the frictional surface 6a by means of the associated air cylinder 25. Consequently, the carriage 1 having reached the position G can be drawn from the turning path 18 only by the friction driver 14 just downstream of this path and driven into the linear path connected to the turning path 18.

In the meantime, power is kept disconnected from the motor 20 for the downstream friction drive roller 15C of the friction driver 19 inside the turning path 18, and this roller is kept in its retraction limit position by the associated air cylinder 25. The friction drive roller 15C is returned to its advance limit position by the air cylinder 25 when the frictional surface 6a is brought out of contact with this roller 15C while the carriage 1 is passing forward from the turning path 18.

As stated above, power is disconnected from the motor 20 for each of the friction drive rollers 15A–15C of the friction drivers 19 for the turning paths 18, and the friction drive roller 15A, 15B or 15C is shifted to its retraction limit position by the associated air cylinder 25 when the just downstream friction drive roller 15B, 15C or 15 starts to be driven in contact with the frictional surface 6a of the carriage 1. At least while the carriage 1 is passing along the whole length of each of the turning paths 18, all of the associated friction drive rollers 15A–15C might alternatively be kept driven. The friction drive rollers 15A–15C might not be so controlled as to shift to their respective retraction limit positions, because they can rotate in contact with the frictional surface 6a while power is disconnected from the associated motors 20.

As clear from FIGS. 7–9, the friction drive rollers 15A–15C of each of the friction drivers 19 are so spaced that, just after the frictional surface 6a comes into contact with two friction drive rollers 15A and 15B or two friction drive rollers 15B and 15C (for example, in the position C or E) at the same time, the surface 6a shifts toward the center line 18a of the associated turning path 18 away from the roller 15A or 15B, which is upstream of the roller 15B or 15C, respectively, as the carriage 1 moves forward and turns. Accordingly, the two friction drive rollers 15A and 15B or friction drive rollers 15B and 15C are in compressive contact with the frictional surface 6a simultaneously for a very short time.

When the frictional surface 6a comes into contact with the two friction drive rollers 15A and 15B or two friction drive rollers 15B and 15C at the same time, power might not be disconnected from the motor 20 for the roller 15A or 15B, which is upstream of the roller 15B or 15C, respectively, and/or the roller 15A or 15B might not be retracted from the frictional surface 6a, but all of the friction drive rollers 15A–15C might be kept driven at least while the carriage 1 is passing along the whole length of the turning path 18. In this case, almost no harmful influence would conceivably be exerted.

If each of the friction drivers 19 for the turning paths 18 included four or more friction drive rollers spaced at shorter intervals along the associated turning path, two adjacent friction drive rollers would be in compressive contact with the frictional surface 6a of the carriage 1 simultaneously for a longer time. In this case, two adjacent friction drive rollers would be in contact with two points on the frictional surface 6a at the same time. The two points would have different turning radii. In other words, the distance between each of these points and the center of curvature of the turning path 18 would differ. Accordingly, the two adjacent friction drive rollers in compressive contact with the frictional surface 6a would exert different thrusts to the carriage 1. As a result, one of these friction drive rollers would slip on the frictional surface 6a and wear out remarkably. Therefore, in this case, it would be essential that the friction drivers 19 be controlled as they are controlled in this embodiment.

In the foregoing embodiment, when the frictional surface 6a comes into compressive contact with two friction drive rollers 15A and 15B or two friction drive rollers 15B and 15C at the same time, power is disconnected from the motor 20 for the roller 15A or 15B, which is upstream of the roller 15B or 15C, respectively, and/or the roller 15A or 15B is retracted from the frictional surface 6a, so that the other roller 15B or 15C drives the carriage 1. After the frictional surface 6a comes into compressive contact with the friction drive rollers 15A and 15B or friction drive rollers 15B and 15C at the same time, the carriage 1 moves forward and turns with the frictional surface 6a leaving the drive roller 15A or 15B, which is upstream of the roller 15B or 15C, respectively. Alternatively, until the frictional surface 6a thus leaves the friction drive roller 15A or 15B, the other drive roller 15B or 15C might not start to be driven, but only the roller 15A or 15B might keep driving the carriage 1. In this case, when the friction drive roller 15A or 15B is returned from the frictional surface 6a to its advance limit position by the associated air cylinder 25, the other drive roller 15B or 15C might start to be driven so as to keep driving the carriage 1.

The carriage 1 might be guided along the track by means other than the front and rear guided members 4 and 5 and the guide rail 10. The carriage 1 might be driven along the linear paths of the track by means other than the friction drivers shown in the drawings. As obvious from the foregoing description, each of the friction drivers 19 for the turning paths 18 might include one, two, four or more friction drive rollers.

What is claimed is:

1. A friction-drive carriage type conveyor comprising:
    a track including a linear path and a turning path (18);
    a carriage (1) so supported as to run in a running direction on and along the track;
    the carriage (1) having a longitudinal axis and having a frictional surface (6a) continuing linearly throughout substantially the whole length of the carriage parallel to said longitudinal axis;
    said frictional surface (6a) being oriented to face toward a center of an arc of the turning path and having a middle region and front and rear end portions;
    first friction drivers fitted aside of the linear path;
    the first friction drivers including a first friction drive roller (15) positioned for driving contact with the frictional surface (6a) of the carriage along said linear path; and
    an assembly (19) of second friction drivers fitted aside of the turning path (18) and to an inside of the arc of the turning path;
    the second friction driver assembly (19) comprising a plurality of second friction drive rollers (15A–15C) including an upstream-most drive roller (15A), a downstream-most drive roller (15C), and an intermediate drive roller (15B), each arranged for driving contact with the frictional surface (6a) of the carriage over only a portion of a length of said frictional surface;
    the second friction drive rollers being adjacent to one another and spaced at intervals along the turning path (18) which are shorter than the length of the frictional surface (6a) of the carriage;
    wherein each of the second friction drive rollers (15A–15C) comes into compressive contact with the frictional surface (6a) of the carriage (1) driven forward by the just upstream adjacent friction drive roller and drives the carriage to a position where the frictional surface comes into compressive contact with at least the just downstream adjacent friction drive roller;
    said upstream-most drive roller (15A) being positioned to engage and drive said frictional surface over only a limited portion thereof extending from said front end portion to said middle region;
    said intermediate drive roller (15B) being positioned to engage and drive said frictional surface over only said middle region; and
    said downstream-most drive roller (15C) being positioned to engage and drive said frictional surface over only a limited portion thereof extending from said middle region to said rear end portion.

2. A friction-drive carriage type conveyor according to claim 1, wherein
    the turning path (18) is shaped like an arc of 90 degrees for correspondingly changing the running direction of the carriage;
    the turning path (18) having a curvature of the arc such, in relation to the length of the carriage, that the carriage (1) extends through both ends of the turning path when the carriage reaches the middle of the turning path; and
    the two end rollers (15A, 15C) of the second friction drive rollers (15A–15C) are positioned near opposite ends of the turning path (18) and a middle roller (15B) is positioned between both the end rollers, the end and middle rollers being spaced at substantially regular intervals,
    the middle roller (15B) being positioned farther from the center line (18a) of the turning path than the end rollers (15A, 15C).

3. A friction-drive carriage type conveyor according to claim 1, wherein said second friction drive rollers (15A–15C) are biased in the direction of the turning path by hydraulic cylinders.

4. A friction-drive carriage type conveyor according to claim 1, wherein
    the second friction drive rollers (15A–15C) are so spaced that two adjacent ones of the second friction drive rollers can be in contact with the frictional surface (6a) at the same time for a certain part of the turning path (18); and
    wherein, when two adjacent ones of the second friction drive rollers (15A–15C) are in contact with the frictional surface (6a) at the same time, the upstream-located one of the two adjacent rollers is released from the action of driving the carriage (1).

5. A friction-drive carriage type conveyor according to claim 4, wherein the upstream-located one of the two adjacent rollers is released from the driving action by being rendered free to rotate.

6. A friction-drive carriage type conveyor according to claim 4, wherein the upstream-located one of the two adjacent rollers is released from the driving action by being moved away from the center line (18*a*) of the turning path (18) so that the upstream-located roller is separated from the frictional surface (6*a*).

7. A friction-drive carriage type conveyor according to claim 4, wherein
said second friction drive rollers (15A–15C) are biased in the direction of the turning path by hydraulic cylinders; and
wherein the upstream-located one of the two adjacent rollers is released from the driving action by being moved toward an associated retraction limit position by an associated hydraulic cylinder so that the upstream-located roller is separated from the frictional surface (6*a*).

8. A friction-drive carriage type conveyor according to claim 1, wherein the second friction drive rollers (15A–15C) are so spaced that, just before one of the second friction drive rollers, which is in contact with the frictional surface (6*a*), separates from the frictional surface owing to a change in direction of the frictional surface when the carriage (1) runs on and along the turning path (18), the just downstream-adjacent friction drive roller comes into contact with the frictional surface;

whereby the carriage (1) is driven sequentially by the second friction drive rollers (15A–15C) in order of the upstream-most roller (15A), middle roller (15B) and downstream-most roller (15C).

* * * * *